United States Patent

Hahn

[15] 3,699,821

[45] Oct. 24, 1972

[54] DETERMINATION OF VOIDS TO SOLIDS RATIO IN POROUS MATERIALS

[72] Inventor: William C. Hahn, Bartlesville, Okla.

[73] Assignee: Phillips Petroleum Company

[22] Filed: Jan. 4, 1971

[21] Appl. No.: 103,378

[52] U.S. Cl. .................................73/432 R, 73/104
[51] Int. Cl. .............................................G01n 15/08
[58] Field of Search...73/432 R, 432 PS, 86; 356/162

[56] References Cited

UNITED STATES PATENTS 3,225,296    12/1965    Roth......................73/432 PS
2,910,863    11/1959    Hornbostel....................73/86
2,982,169    5/1962    Enright......................356/162

*Primary Examiner*—S. Clement Swisher
*Attorney*—Young and Quigg

[57] ABSTRACT

An etchable surface on which a pattern representing solids and voids is etched to remove a portion of the surface which, in respect to the weight of the total etchable surface, represents the percentage of the area occupied by the voids.

8 Claims, 1 Drawing Figure

PATENTED OCT 24 1972
3,699,821
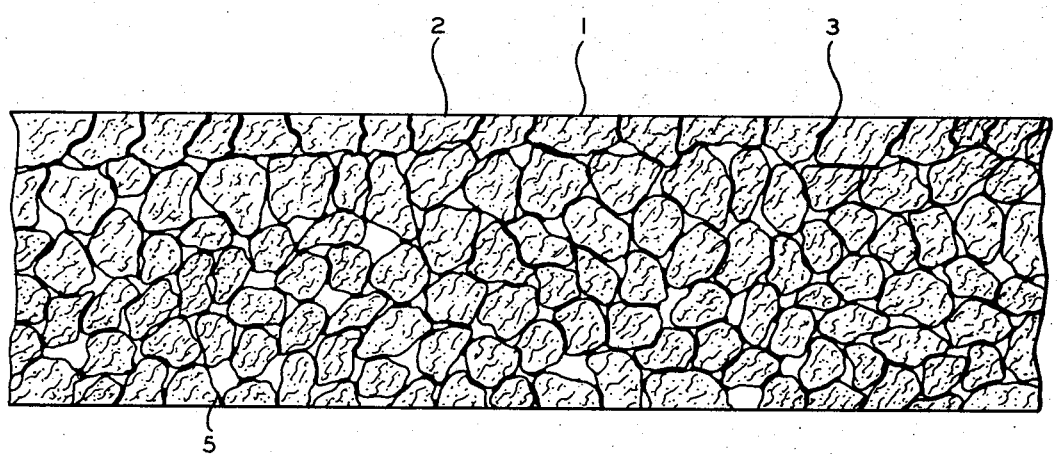
INVENTOR.
W. C. HAHN
BY
ATTORNEYS

DETERMINATION OF VOIDS TO SOLIDS RATIO IN POROUS MATERIALS

This application is filed in accordance with the provisions of Government Solicitation No. F29601-71-C-0042.

This invention relates to a method of determining voids to solids ratios in porous materials.

In one of its more specific aspects, this invention relates to determining the interstitial volume of particulate masses.

A wide variety of masses is composed of particulate matter. In such masses, interstices exist between the particles. While it is generally possible to determine the interstitial volume of such particulate masses, there has been developed no satisfactory method of determining such volumes at various cross sections of the mass. For example, a bed comprised of sand can have water introduced thereinto, the volume of water being introduced prior to the water becoming supernatant to the sand being a measure of the interstitial volume. However, there exists no satisfactory method of determining such volumes at various planes cut through the mass. This invention provides such a method.

According to this invention there is provided a method of determining the interstitial area of a porous surface which involves printing a pattern on an etchable surface of known weight, the pattern being representative of the porous surface which is composed of solid particles and interstices. The etchable surface is then etched to remove a portion which represents the interstices.

The quantity of etchable surface removed by etching is related to the known weight of the etchable surface as representative of the area of the interstices.

This invention also provides a method of determining the voids to solids ratio of a porous surface. While the invention prints a pattern representative of a porous surface and in its actual determination is concerned with the areas of the surface, it will be appreciated that the ratio of the areas concerned is representative of the interstitial volume of the mass which the surface represents.

The method of this invention is applicable to employment with any surface comprised of particles of any nature between which there exist voids. Similarly, this invention is applicable to employment with any type of particles or mixture of particles which occupy a substantially constant position.

For example, the method of this invention is applicable to the determination of free area for holdup determination of catalyst beds; it is applicable to the determination of the amount of insolubles existing in masses from which solubles have been removed by, for example, washing; it is applicable to the determination of voids to solid ratios in materials such as asphalt surfaces, both horizontal and vertical.

The method of this invention involves the determination of the area of the voids and the area of the solids of the surface concerned. The method involves the production of a printed board, comparable to that produced in the production of printing circuit boards and determining the solids content and the voids content of the surface concerned as a function of the loss of metal from the board upon etching.

The etching of copper printed boards is well known. One method involves the deposition of an etchable plating, such as copper, on a suitable surface, printing a pattern on the photosensitized plating and subjecting the printed surface to a chemical solution which removes from the board all the copper except that beneath the printed pattern. If the weights of the original copper plating and the board are known, that weight removed by the etching represents the voids area. That weight remaining on the board after the etching represents the area of the solids and the voids to solids ratio is the ratio between the two weights.

If only the weight of the plated board is known, the decrease in weight resulting from the first etching represents the voids area. A second etching to remove the remaining metal and a weighing of the board thereafter allows a determination of the metal on the board after the first etching as representative of the area of the solids. The ratio of the voids area to the solids area is determinable therefrom.

The method of the present invention will be more easily understood if explained in conjunction with the following example and with the attached FIGURE which illustrates a vertical cross section through an asphalt roadway.

Referring now to the drawing, a vertical cut was made through the asphalt roadway formed of asphalt and gravel in admixture. The vertical cut had the appearance as shown in the drawing in which the roadway surface 1 is comprised of gravel particles 2 which are adhered together by means of asphalt 3 with interstices 5 existing between the solids. A photographic negative of the cross section was made and a copper-deposited board was photosensitized and exposed in the conventional manner, the weight of the board and metal deposit being known.

The board was developed and etched in the conventional manner, the etching serving to remove from the board those portions of metal corresponding to the interstices. The board was weighed and the weight of the metal etched from the board was determined.

The remaining copper was then etched away and the board, now devoid of metal, was weighed again, the weight of that metal removed in the second etching being representative of solids of the cross section. The voids to solids ratio was determined as the ratio between the weight of the metals removed in the etching steps.

It will be evident from the foregoing that various modifications can be made to the method of this invention. Such modifications are, however, considered to be within the scope of the invention.

What is claimed is:

1. A method of determining the interstitial area of a surface comprised of solid particles and interstices which comprises:
   a. printing a pattern of said surface on a photosensitized etchable substance of known weight;
   b. etching said etchable substance to remove a portion thereof representative of said interstices; and,
   c. weighing the etched substance and determining the quantity of said portion removed in relation to the known weight of said etchable substance as representative of the area of said interstices.

2. The method of claim 1 in which said etchable substance is deposited on a surface of known weight and that etchable substance remaining after the etching of step (6) is removed and determined as representative of the area of said solid particles.

3. The method of claim 2 in which said etchable substance is copper and said surface is an asphalt surface.

4. The method of claim 1 in which said etchable substance is copper.

5. The method of claim 1 in which said surface is an asphalt surface.

6. The method of claim 1 in which said surface is an catalyst surface.

7. The method of claim 1 in which said interstices are formed by removing solubles from masses comprising solubles and insolubles.

8. The method of claim 1 in which a second etching is performed after step (c) to remove a second portion of said etchable substance.

* * * * *

UNITED STATES PATENT OFFICE

CERTIFICATE OF CORRECTION

Patent No. 3,699,821　　　　William C. Hahn　　　　Dated: October 24, 1972

It is certified that error appears in the above-identified patent and that said Letters Patent are hereby corrected as shown below:

Column 3, line 1, "(6)" should read --- (b) ---.

Signed and sealed this 6th day of March 1973.

(SEAL)
Attest:

EDWARD M. FLETCHER, JR.
Attesting Officer

ROBERT GOTTSCHALK
Commissioner of Patents